US011031792B2

(12) United States Patent
Wagoner (10) Patent No.: US 11,031,792 B2
(45) Date of Patent: Jun. 8, 2021

(54) BATTERY CHARGING CONTROL SYSTEM AND METHOD OF OPERATION THEREOF

(71) Applicant: GE Energy Power Conversion Technology Ltd, Rugby (GB)

(72) Inventor: Robert Gregory Wagoner, Salem, VA (US)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 11 days.

(21) Appl. No.: 15/229,323

(22) Filed: Aug. 5, 2016

(65) Prior Publication Data

US 2018/0041050 A1 Feb. 8, 2018

(51) Int. Cl.
*H02J 7/00* (2006.01)
*H02J 3/32* (2006.01)

(52) U.S. Cl.
CPC .............. *H02J 7/0016* (2013.01); *H02J 3/32* (2013.01); *H02J 7/0013* (2013.01); *H02J 7/0021* (2013.01)

(58) Field of Classification Search
CPC ...... H02J 7/0016; H02J 7/0013; H02J 7/0021; H02J 3/32; H02J 7/0022; H02J 7/0027; H02J 13/0006; H02J 3/322
See application file for complete search history.

(56) References Cited

U.S. PATENT DOCUMENTS

| 9,455,578 | B2 * | 9/2016 | Kim | H02J 7/345 |
| 2011/0279085 | A1 * | 11/2011 | Shigemizu | H01M 10/441 |
| | | | | 320/117 |
| 2013/0002026 | A1 * | 1/2013 | Mizutani | H02J 7/0071 |
| | | | | 307/65 |
| 2013/0049698 | A1 * | 2/2013 | Jung | H02J 7/0016 |
| | | | | 320/134 |
| 2014/0159643 | A1 * | 6/2014 | Wagoner | H02J 7/0021 |
| | | | | 320/107 |
| 2014/0340092 | A1 * | 11/2014 | Kim | G01R 31/396 |
| | | | | 324/430 |
| 2014/0342193 | A1 * | 11/2014 | Mull | H01M 10/4257 |
| | | | | 429/50 |
| 2014/0361732 | A1 * | 12/2014 | Nishikawa | H02J 7/0014 |
| | | | | 320/107 |
| 2015/0077061 | A1 * | 3/2015 | Nomura | H01M 10/46 |
| | | | | 320/126 |
| 2016/0190801 | A1 * | 6/2016 | McGrath | H01M 10/4207 |
| | | | | 307/72 |

OTHER PUBLICATIONS

Extended European Search Report and Opinion issued in connection with corresponding EP Application No. 17184072.1 dated Dec. 5, 2017.

* cited by examiner

*Primary Examiner* — Drew A Dunn
*Assistant Examiner* — Sailesh Thapa
(74) *Attorney, Agent, or Firm* — Wood IP LLC (57) ABSTRACT

There are provided control systems and methods for charging batteries. For instance, there is provided a system for charging at least two batteries. The system can include a set of hardware associated with the at least two batteries, and the at least two batteries can be connected in series. Each battery from the at least two batteries can be associated with a subset of the set of hardware, and one subset of the set of hardware can be configured to control an associated battery independently from another subset of the set of hardware and its associated battery.

10 Claims, 6 Drawing Sheets

BATTERY CHARGING CONTROL SYSTEM AND METHOD OF OPERATION THEREOF

TECHNICAL FIELD

The present disclosure relates to batteries. More particularly, the present disclosure relates to battery charging control systems and methods for operating such systems.

BACKGROUND

In a battery energy storage system, when batteries are placed in series and one battery is replaced, i.e. when a new battery (or generally another battery) is placed in the series with the remaining batteries, the charge/discharge rates for the new battery is typical different than those of the remaining batteries. This discrepancy causes the lifetime of the new battery and of the entire series to be reduced.

Generally, in a series connection, the output power delivery capability of the entire series is dominated by the battery that has the worst performance. For example, if one battery in the series is older than the other batteries or is performing sub-optimally, the collective performance of the series-connected batteries will be limited to the performance of that one battery.

Typical battery control systems do not account for the above-noted discrepancies that may exist in a series connection of batteries. As such, current battery control systems treat the series connection as a single battery and provide charging and discharging functions uniformly to all the batteries in the series. This results in reduced lifetime and suboptimal performance of the entire series of batteries.

SUMMARY

The embodiments featured herein help solve or mitigate the above-noted deficiencies as well as other issues known in the art. For instance, one embodiment can provide a method for operating a battery energy storage system. The method can include coupling the battery energy storage system to an electric power utility grid such that the electric power utility grid is configured to transmit at least one phase of electric power to and from the battery energy storage system. The method can also include controlling the battery energy storage system's charge/discharge functions to improve battery reliability and operation with optimum output power capability. Furthermore, the method can include adjusting the battery model of a battery to continue to charge/discharge the battery reliably with optimum output power capability as the battery ages.

Another embodiment can provide a system for charging at least two batteries. The system can include a set of hardware associated with the at least two batteries, and the at least two batteries can be connected in series. Each battery from the at least two batteries can be associated with a subset of the set of hardware, one subset of the set of hardware is configured to control an associated battery independently from another subset of the set of hardware and its associated battery.

Another embodiment can provide a method for charging at least two batteries. The method can include controlling one of a discharging current and a charging current of one of the at least two batteries independently from at least one other battery of the at least two batteries.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

The illustrative embodiments of the disclosure are directed to, among other things, controlling battery charging. As an overview, certain battery charging systems can include a battery, a battery charger. In some embodiments, the battery charger can include a battery monitor, a battery charging component, and a controller. In one embodiment, the charging of the battery can be controlled by certain operations. The operations can include receiving state information related to the battery from the battery monitor.

Further, the operations can include measuring a battery charge curve and/or a battery discharge curve associated with the battery based at least in part on the state information related to the battery. The operations can also include creating a model of the battery based at least in part on the battery charge curve and/or the battery discharge curve associated with the battery. Moreover, the operations can include determining whether to adjust the model of the battery based at least in part on the state information related to the battery. The operations can yet also include adjusting the model of the battery in response to a determination that the model associated with the battery is to be adjusted.

The technical effects of certain embodiments of the disclosure may include facilitating the operation of battery energy storage systems, such as facilitating higher battery reliability and higher battery output power capability. Moreover, technical effects of certain embodiments of the disclosure may include fine tuning the charging operations for certain batteries, and slowly adjusting the performance of the certain batteries to continue to be optimal as the certain batteries change with age and maintenance cycles.

Figure 1:
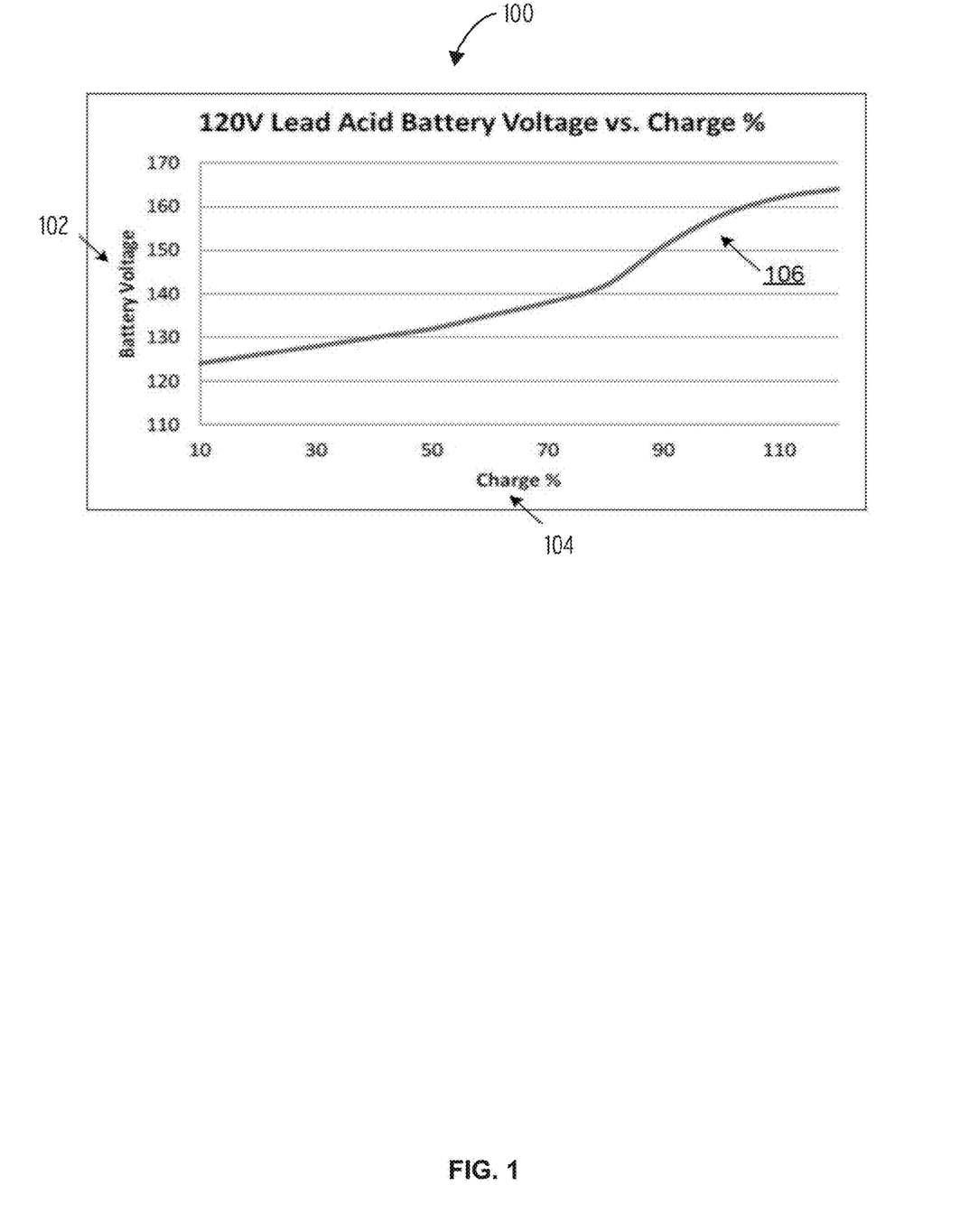
FIG. 1 illustrates an aspect of the subject matter in accordance with some embodiments featured herein.

FIG. 1 depicts a graphical view of the charging of a plurality of lead acid batteries with a nominal voltage rating of 120 VDC, as an example for illustration. These curves could also be attributed to lithium ion batteries or other types of batteries. The graphical view 100 includes a vertical axis 102, a horizontal axis 104, and a charge curve 106. The vertical axis 102 represents the voltage of the batteries. The horizontal axis 104 represents the charge percent of the batteries. The charge curve 106 represents the relationship between the voltage of the batteries and the charge percent of the batteries. In certain embodiments, a charge curve, such as 106, can be measured based at least in part on state information related to a battery. In some embodiments, a model of a battery can be created based at least in part on a charge curve, such as 106.

Figure 2:
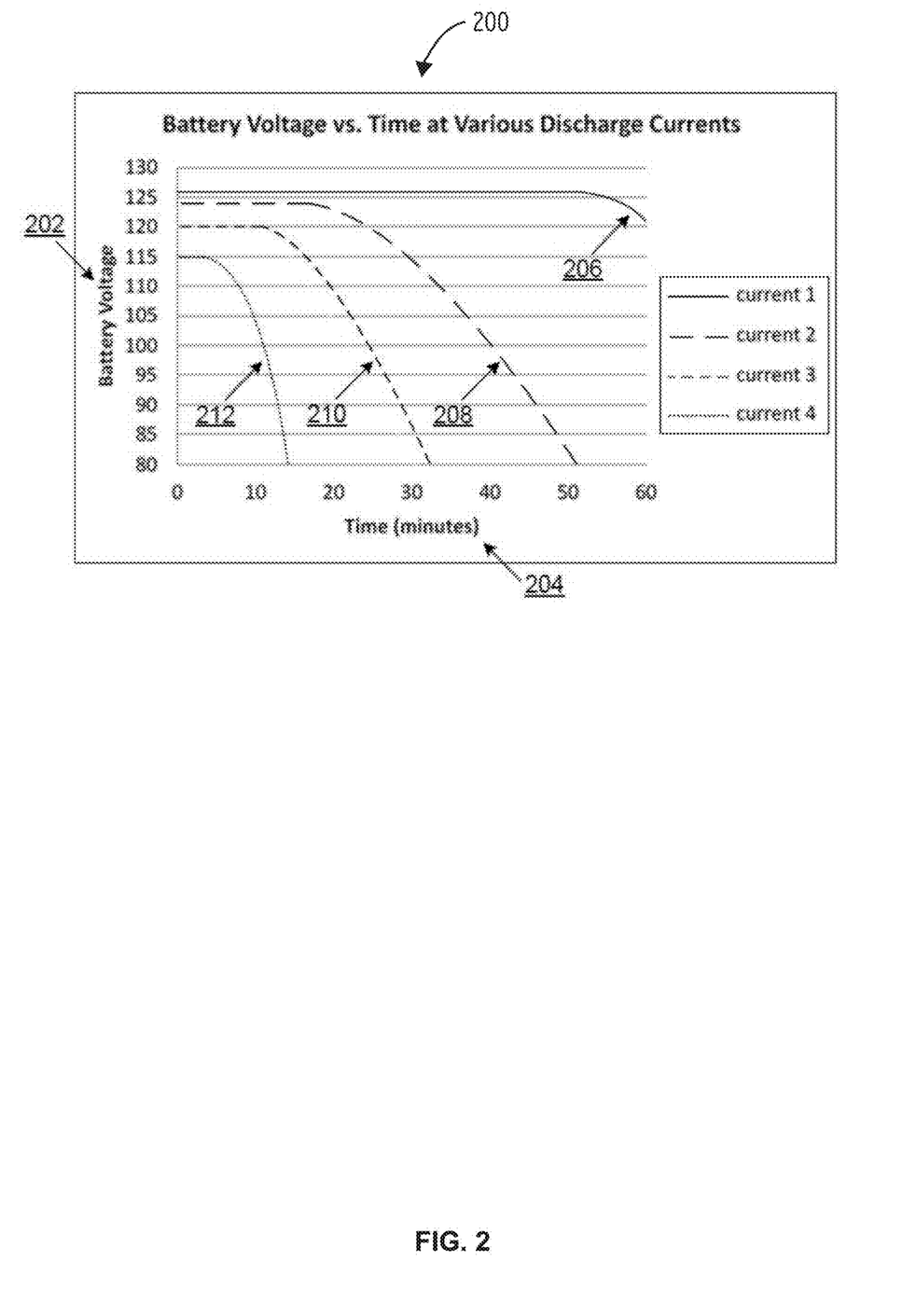
FIG. 2 illustrates an aspect of the subject matter in accordance with some embodiments featured herein.

FIG. 2 depicts a graphical view 200 of the discharging of a series of batteries with a nominal voltage rating of 120 VDC, as an example for illustration. The graphical view 200 includes a vertical axis 202, a horizontal axis 204, and four discharge curves. The discharge curves are associated with a first current 206, a second current 208, a third current 210, and a fourth current 212, respectively. The vertical axis 202 represents the voltage of the batteries. The horizontal axis 204 represents the time discharging the respective current in minutes.

The discharge curves 206, 208, 210 and 212 represent the relationship between the voltage of the batteries and the time discharging the respective currents. For instance, the discharge curve associated with the first current 206 represents the relationship between the voltage of the batteries and the time discharging the first current. In certain embodiments, a discharge curve, such as 206, 208, 210, and 212, can be measured based at least in part on state information related to a battery. In some embodiments, a model of a battery can be created based at least in part on a discharge curve, such as 206, 208, 210, and 212. Additional details regarding discharging and charging characteristics of batteries can be found in U.S. patent application Ser. No. 13/712,431, filed on Dec. 12, 2012, the content of which is incorporated herein in its entirety by reference.

Figure 3A:
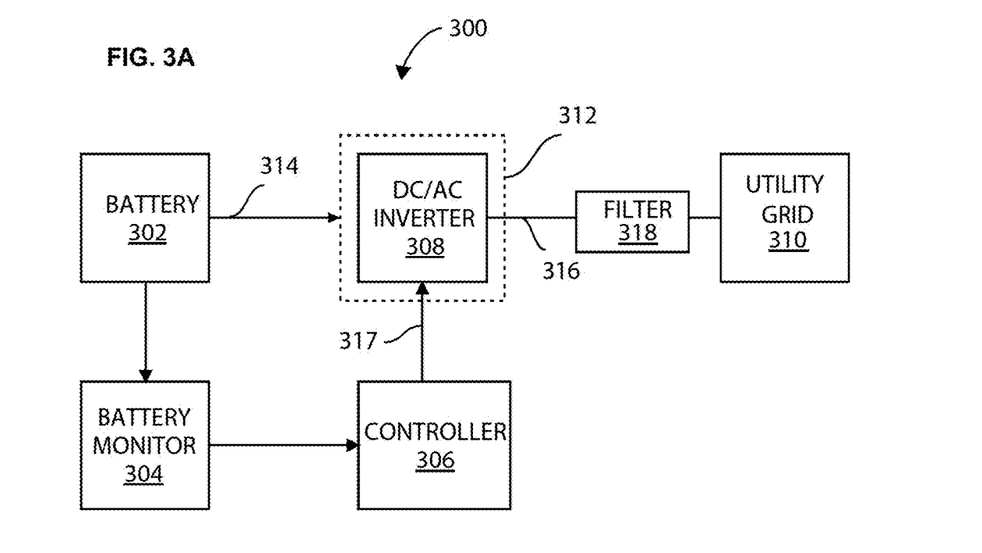
FIG. 3A illustrates an aspect of the subject matter in accordance with some embodiments featured herein.
Figure 3B:
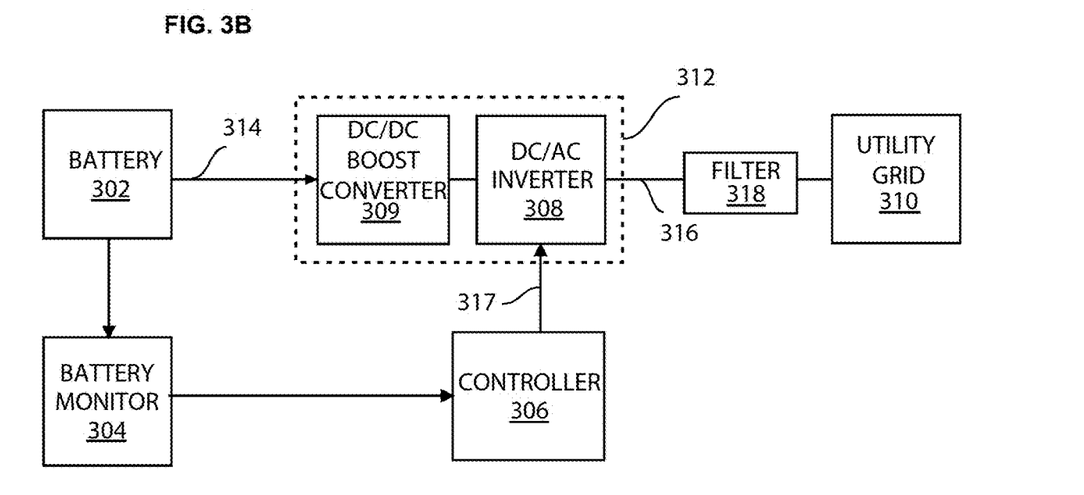
FIG. 3B illustrates an aspect of the subject matter in accordance with some embodiments featured herein.

FIG. 3A depicts certain illustrative components for a system 300 in which techniques for controlling battery charging and discharging may be implemented. The exemplary system 300 can include at least one battery 302, at least one battery monitor 304, at least one controller 306 connecting to at least one charging/discharging component 312 via a line 317. The charging/discharging component can include a DC/AC inverter 308, or it include a DC/AC boost converter 309 coupled to the DC/AC inverter 308 (as shown in FIG. 3B).

The system 300 can be interfaced with at least one utility grid 310. In some embodiments, there may be a filter 318 connecting the utility grid 310 and the system 300 via a line 316. In other embodiments, the filter 318 may be integrated with the at least one charging/discharging component 312. The filter 318 can include an inductor, or an inductor and a capacitor circuit, and it is configured to filter and condition signals from and to the at least one utility grid 310.

The system 300 can facilitate the transmission of at least one phase of electric power from the at least one battery 302 to the at least one utility grid 310, and vice versa. For example, the at least one phase of electric power can be a single phase of electric power or multiple phases of electric power. The at least one battery 302 is connected, via a line 314, to the charging/discharging component 312, which can deliver or extract power from the at least one battery 302.

The at least one battery 302 can include any type of cell capable of storing at least one phase of electric power, such as a lead-acid battery, a nickel cadmium battery, a lithium-ion battery, a lithium polymer battery, a nickel-metal hydride (NiMH) battery, a vanadium redox flow battery, a zinc-bromine battery, a lithium air battery, a lithium ion lithium cobalt oxide battery, a magnesium-ion battery, and a molten salt battery. The at least one battery 302 can be coupled to the at least one utility grid 310 via the at least one charging component 312 such that the at least one utility grid 310 is configured to transmit at least one phase of electric power to and from the at least one battery 302.

In one embodiment, the battery 302 can be coupled to the utility grid 310 via the charging component 312, and the DC/AC inverter 308 included therein can be coupled to the utility grid 310 via the filter 318. As previously stated, the filter 318 can facilitate the transmission of a phase of AC voltage from the battery monitor 304 to the utility grid 310, and vice versa.

While the battery monitor 304 and the controller 306 are depicted in FIG. 3 as separate components, the battery monitor 304 and the controller 306 can be combined in a single component without departing from the spirit and scope of the disclosure. The battery monitor 304 can be coupled to the battery 302 and the controller 306 to facilitate the transmission of state information related to the battery 302.

The battery monitor 304 may include a sensor (not shown) that is in communication with the battery 302. The sensor may be, for example, a voltage sensor, a current sensor, and/or a temperature sensor. The sensor of the battery monitor 104 can measure and/or identify state information related to the battery 302.

The controller 306 can be coupled to the battery monitor 304 and the charging component 312 to facilitate control of the charging the battery 302. In one embodiment, the controller 306 can be coupled to the charging component 312 and the battery monitor 304 to control the operations of the component 312 with respect to the battery 302. The controller 306 can include a processor and a memory, as will be further described in FIG. 5.

The battery monitor 304 can provide the controller 306 with state information related to the battery 302. The controller 306 can use the state information related to the battery 302 to measure and/or otherwise define a charge curve and/or a discharge curve. The controller 306 can use the charge curve and/or the discharge curve to create a model of the battery 302. The model of the battery 302 can include data that describes the state and/or health of the battery 302.

For example, the model of the battery 302 can include, but is not limited to, data describing the voltage, current, temperature, capacity, output power, cycle count, and degradation of the battery 302. The controller 306 can determine whether the model of the battery 302 requires or otherwise needs adjustment based at least in part on state information related to the battery 302 provided by the battery monitor 304.

The controller 306 can be configured to determine that the model of the battery 302 requires or otherwise needs adjustment if the state information related to the battery 302 is sufficiently different from the model of the battery 302.

For example, an administrator of the controller 306 can define a predetermined level that the controller 306 can use as a basis for determining that the model of the battery 302 is sufficiently different from the state information related to the battery 302.

Upon a determination that the model of the battery 302 needs adjustment, the controller 306 can adjust the model of the battery 302. The controller 306 can use the state information related to the battery 302 to adjust the model of the battery 302.

The controller 306 can determine whether to adjust an operation of the charging component 312 of the system 300, the DC/AC inverter 308 and/or the DC/DC boost converter 308. The controller 306 can use state information related to the battery 302 provided by the battery monitor 304 to determine whether to adjust the operation of the charging component 312. The controller 306 can be configured to determine that the charging component 312 requires or otherwise needs adjustment if the state information related to the battery 302 is sufficiently different from the model of the battery 302.

For example, an administrator of the controller 306 can define a predetermined level that the controller 306 can use as a basis for determining that the model of the battery 302 is sufficiently different from the state information related to the battery 302. Upon a determination that the operation of the charging component 312 requires or otherwise needs adjustment, the controller 306 can adjust the operation of the charging component 312. The controller 306 can use the model of the battery 302 to adjust the operation of the charging component 312.

The controller 306 can determine whether a predetermined level has been reached. For example, an administrator (or a control device) of the controller 306 can define the predetermined level. The controller 306 can use state information related to the battery 302 provided by the battery monitor 304 to determine whether the predetermined level has been reached. Upon a determination that the predetermined level has been reached, the controller 306 can provide, generate, or otherwise facilitate a warning related to the predetermined level having been reached.

Figure 4:
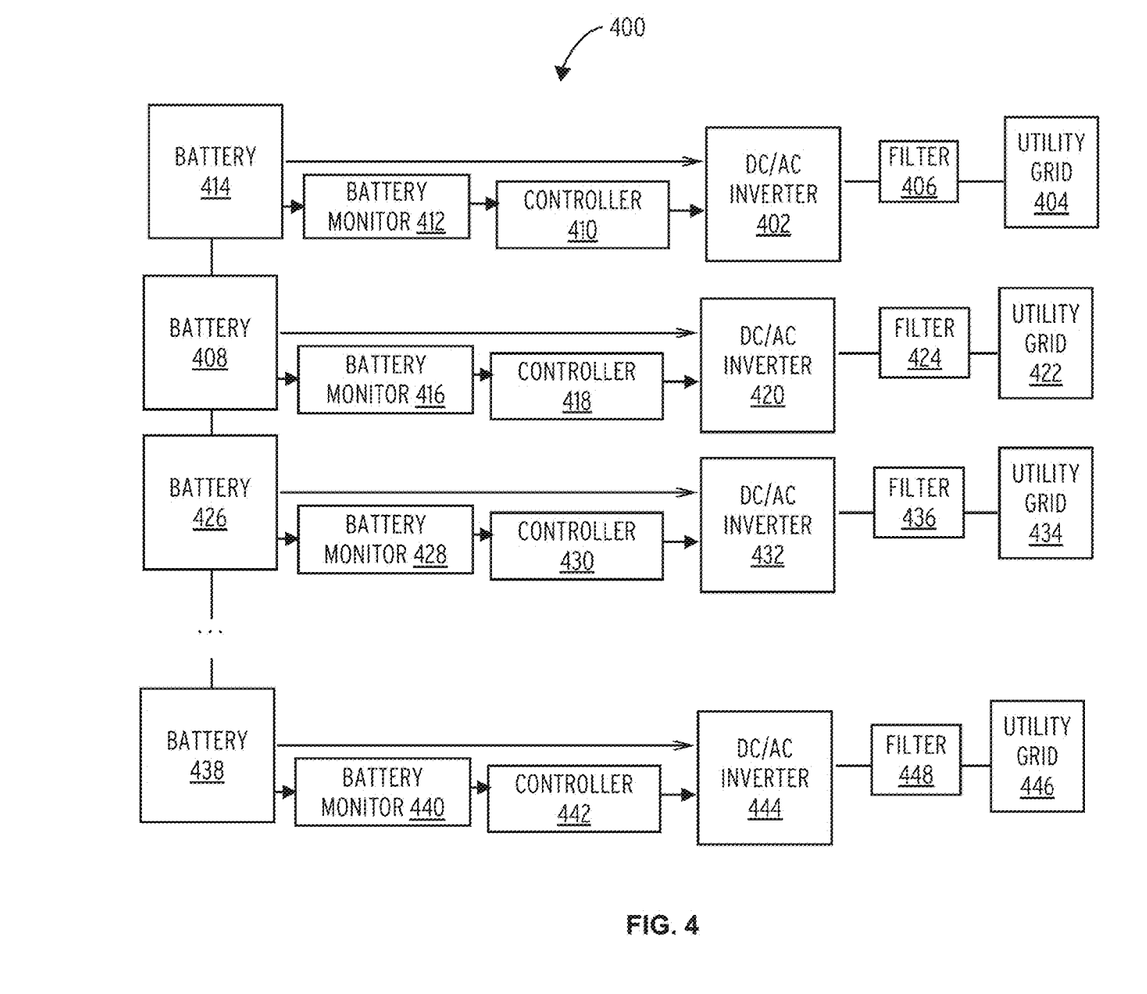
FIG. 4 illustrates an aspect of the subject matter in accordance with some embodiments featured herein.

FIG. 4 illustrates a system 400 according to an embodiment. In the system 400, a plurality of batteries like the battery 302 can be connected in series, as depicted by the vertical line joining batteries 414, 408, 426, and 438. Each of the aforementioned batteries can be part of a subsystem, similar in architecture to the system 300 discussed previously. Namely, the battery 414 can be part of a subsystem that includes a battery monitor 412, a controller 410, and an inverter 402. (The charging component 312 is not labeled for simplicity.) Furthermore, the subsystem associated with the battery 414 may be connected to a utility grid 404, via a filter 406, which may or may not be part of the inverter battery 414, as discussed in the case of the system 300.

Similarly, the battery 408 can be associated with a subsystem that includes a battery monitor 416, a controller 418, and an inverter 420, while being connected to a utility grid 422 via a filter 424. The battery 406 can be associated with a subsystem that includes a battery monitor 428, a controller 430, and an inverter 432, while being connected to a utility grid 434 via a filter 436. And the battery 438 can be associated with a subsystem that includes a battery monitor 440, a controller 442, and an inverter 444. That subsystem can be connected to a utility grid 446, via a filter 448. In some embodiments, all the utility grids shown (e.g. utility grids 404, 422, 434, and 446) may form a single utility grid that is interfaced with the system 400.

In some embodiments, the system 400 can be configured to charge at least two batteries, or all of the batteries that it is coupled to. The at least two batteries (or all of the batteries) can be connected in series. The system 400 can include a set of hardware associated with the at least two batteries, i.e. each battery may have a dedicated subsystem such as the ones described above, and each dedicated subsystem can function and be similar in architecture like the system 300 shown in and described with respect to FIG. 3.

One subset of the set of hardware, i.e. the subsystem dedicated to a particular battery, can be configured to control the battery associated to it independently from another subset of the set of hardware and its associated battery. For example, the subsystem associated with the battery 414 can control the charging of the battery 414 independently from charging characteristics of the battery 408 and/or the operation of the subsystem associated with the battery 408, even though the battery 408 and the battery 414 are connected in series.

As such, if, for example, the battery 408 ages faster than the battery 414, its associated subsystem can alter its charge/discharge characteristics without influencing the charge/discharge characteristics of the battery 414. As such, collectively, the battery 414 and the battery 408 can provide optimum performance because charging/discharging characteristics can be dynamically modified to compensate for drift in battery performance, and/or charging characteristics, and/or discharging characteristics.

Generally, the one subset of the set of hardware can be configured to perform at least one of monitoring, charging, and discharging the associated battery. Furthermore, the DC to AC inverter included in the one set of hardware can be connected to a load circuit, which may be a utility grid, or a generator, for example.

Figure 5:
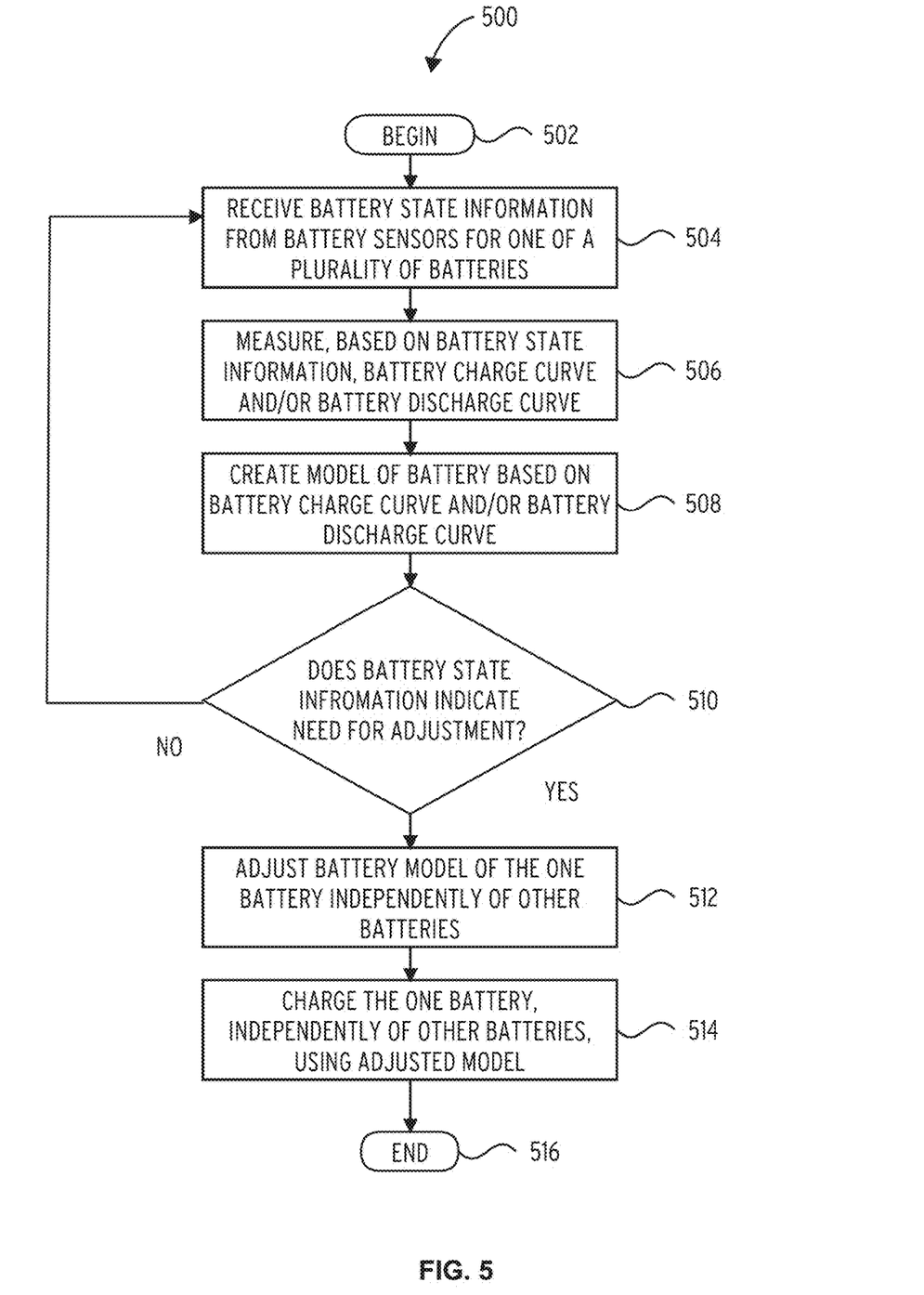
FIG. 5 illustrates a method in accordance with some embodiments featured herein.

Having set forth various structural embodiments, a method 500 consistent with their operation is now described with respect to FIG. 5. The method 500 can begin at block 502, and it can include receiving battery state information by a controller included in a subsystem dedicated to one battery of a plurality of batteries connected in series (block 504). The method 500 can further include measuring, based on the received battery state information, a battery charge curve and/or a battery discharge curve (block 506) and creating a battery model for the battery based on the charge and/or discharge curves (block 508).

At decision block 510, the method 500 can include determining whether the battery state needs adjustment. In other words, the method 500 can include checking the model created at block 508 against a predetermined battery model, which may have been generated from a previous time, or at manufacture.

If the generated battery model does not differ from the predetermined battery model (NO at decision block 510), the method 500 can revert back to block 504 and reinitiate the previously described sequence of operations. When the generated battery model does differ from the predetermined battery model (YES at decision block 510), the method can continue to block 512 where the battery model is adjusted, preferably to the predetermined battery model (block 512). This adjustment can be performed by altering the inverter's parameters to perform charging and charging characteristics consistent with those dictated by the predetermined battery model. The method 500 can then include charging the battery according to the adjusted battery model (block 514), at which point the method 500 can either end at block 516 or revert to block 502.

In the method 500, charging the one battery, adjusting its model, and any other operations pertaining to the sequence described above can be performed independently from other batteries that are connected in series to the one battery. In other words, the method 500 can permit adjusting a model of a specified battery and charging the specified battery can be performed independently of one or more batteries that are in a series connection with the specified battery.

In some embodiments, two or more batteries can be connected in series and interfaced with one dedicated subsystem while other batteries connected in series to the two or more batteries are managed by other subsystems. In these embodiments, the method 500 can be performed for the two or more batteries using the dedicated subsystem independently of the other batteries connected in series with the two or more batteries.

One of ordinary skill in the art will readily recognize that some operations described above can be performed independently from and that the method 500 need not be executed in whole. For example, the method 500 can be used without charging the batteries (block 514), i.e. it can be used to adjust battery models. In such embodiments, the method 500 can be used without feedback, and it can thus serve to monitor and adjust battery models as batteries in a series connection age. For example, the models can be saved periodically into a database to provide calibration data for the manufacture of new batteries.

Figure 6:
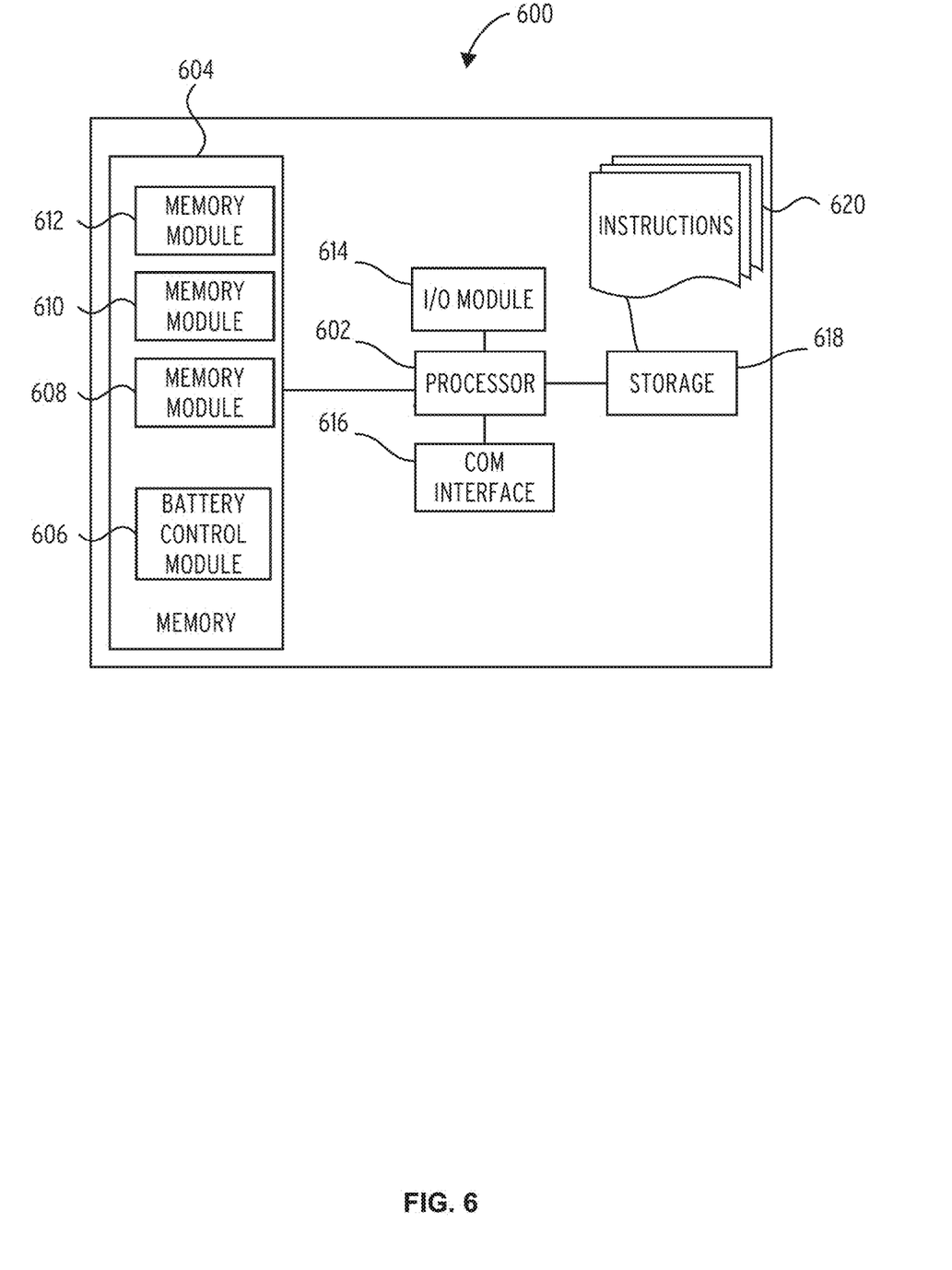
FIG. 6 illustrates a device in accordance with some embodiments featured herein.

Having set forth various exemplary embodiments, a controller 600 (or system) consistent with their operation is now described with respect to FIG. 6. The controller 600 can be interfaced with a battery as shown in FIG. 3, with respect to the controller 306.

The controller 600 can include a processor 602 that has a specific structure. The specific structure is imparted to processor 602 by instructions stored in a memory 604 and/or by instructions 620 that can be fetched by the processor 602 from a storage medium 618. The storage medium 618 may be co-located with the controller 600 as shown, or it may be located elsewhere and be communicatively coupled to controller 600.

The controller 600 can be a stand-alone programmable system, or it can be a programmable module located in a much larger system. For example, controller 600 can be part of the system 300, as mentioned above.

The controller 600 may include one or more hardware and/or software components configured to fetch, decode, execute, store, analyze, distribute, evaluate, and/or categorize information. Furthermore, the controller 600 can include an input/output (I/O) 414 that configured to interface with a battery as shown in the system 300.

The processor 602 may include one or more processing devices or cores (not shown). In some embodiments, the processor 602 may be a plurality of processors, each having either one or more cores. The processor 602 can be configured to execute instructions fetched from memory 604, i.e. from one of memory module 612, memory module 610, memory module 608, or battery control module 606, or the instructions may be fetched from storage medium 618, or from a remote device connected to controller 600 via communication interface 616.

Furthermore, without loss of generality, the storage medium 618 and/or the memory 604 may include a volatile or non-volatile, magnetic, semiconductor, tape, optical, removable, non-removable, read-only, random-access, or any type of non-transitory computer-readable computer medium. The storage medium 618 and/or the memory 604 may include programs and/or other information that may be used by the processor 602. Furthermore, the storage medium 618 may be configured to log data processed, recorded, or collected during the operation of the controller 600. The data may be time-stamped, location-stamped, cataloged, indexed, or organized in a variety of ways consistent with data storage practice.

In one embodiment, for example, the battery control module 606 may include instructions that, when executed by processor 602, cause processor 602 to perform certain operations. The operations can include controlling one of a discharging current and a charging current of one of at least two batteries independently of at least one other battery from the at least two batteries. In general, the controller 600 can be programmed by the instructions of the battery control module 606 to perform the operations detailed in the description of the method 500 as well as the other functions described throughout this disclosure.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A system for charging two or more batteries connected together in series, the system comprising:

two or more respective hardware subsystems each corresponding to one respective battery of the two or more batteries, each respective hardware subsystem comprising:

a respective battery charging/discharging component electrically coupled to one port of its respective battery for charging, and discharging the respective battery;

a respective battery monitor coupled to another port of its respective battery and configured for sensing state information of the respective battery in series-connection with the other batteries of the two or more batteries, and configured to provide the sensed state information as an output therefrom; and a respective controller comprising a processor and configured for determining a charging curve of the respective battery responsive to the sensed state information output from the respective battery monitor, the controller creating a dynamic model of the respective battery (i) based upon the determined charging curve and (ii) representing a real time health state of the battery; wherein:

the controller (i) compares the dynamic model with a stored predetermined model for the respective battery, and (ii) adjusts operation of the battery charging component based upon the comparing; and operation of each of the battery charging components is dynamically adjusted (i) independent from characteristics determined by any of the other battery charging components and (ii) to compensate for drift in charging/discharging characteristics of its corresponding battery.

2. The system of claim 1, wherein each respective battery charging/discharging component of each respective hardware subsystem comprises a DC to AC inverter.

3. The system of claim 2, wherein each inverter includes a filter.

4. The system of claim 2, wherein the DC to AC inverter is configured to be connected to a load circuit.

5. The system of claim 4, wherein the load circuit is a utility grid.

6. The system of claim 4, further comprising an inductor disposed between the inverter and the load circuit.

7. The system of claim 1, wherein:
the controller of each respective hardware subsystem is configured to regulate its battery charging/discharging component to alter one of a discharge current and a charging current of its respective battery with a charging or discharging current which is sourced independent of the charging/discharging current for any other battery of the two or more batteries.

8. The system of claim 1, wherein the one respective battery comprises a second plurality of batteries, wherein the respective hardware system is configured to monitor and charge the second plurality of batteries.

9. The system of claim 1, wherein the charging any one respective battery by its respective hardware subsystem is performed independently of charging by any of the other hardware subsystems of the one or more other batteries that are in a series connection with the respective battery.

10. The system of claim 1, wherein each respective battery of the one or more batteries is configured for charging and discharging via electrical coupling to a respective electrical grid which is independent of the any electrical charging/discharging grid coupled to any other battery of the one or more batteries.

* * * * *